United States Patent
Barrenscheen et al.

(10) Patent No.: US 9,787,191 B2
(45) Date of Patent: Oct. 10, 2017

(54) CONVERTER WITH QUASI-RESONANT MODE OF OPERATION FOR SUPPLYING POWER TO A LOAD

(71) Applicant: Infineon Technologies Austria AG, Villach (AT)

(72) Inventors: Jens Barrenscheen, Munich (DE); Martin Krueger, Munich (DE); Marcus Schaemann, Munich (DE); Ali Fawaz, Dearborn, MI (US)

(73) Assignee: Infineon Technologies Austria AG, Villach (AT)

( * ) Notice: Subject to any disclaimer, the term of this patent is extended or adjusted under 35 U.S.C. 154(b) by 110 days.

(21) Appl. No.: 14/794,655

(22) Filed: Jul. 8, 2015

(65) Prior Publication Data

US 2017/0012538 A1      Jan. 12, 2017

(51) Int. Cl.
  *H02M 3/335*    (2006.01)
  *H02M 1/42*     (2007.01)
  *H02M 1/00*     (2006.01)

(52) U.S. Cl.
  CPC ..... *H02M 3/33507* (2013.01); *H02M 1/4258* (2013.01); *H02M 3/33592* (2013.01); *H02M 2001/0058* (2013.01)

(58) Field of Classification Search
  CPC .............. H02M 3/33507; H02M 3/33592
  USPC ........................................... 363/21.03
  See application file for complete search history.

(56) References Cited

U.S. PATENT DOCUMENTS

| 8,212,704 | B2 | 7/2012 | Anastasov et al. | |
| 8,391,027 | B2* | 3/2013 | Lidak | H02M 3/33507 363/20 |
| 2010/0219802 | A1* | 9/2010 | Lin | H02M 3/33507 323/284 |
| 2011/0304487 | A1 | 12/2011 | Anastasov et al. | |
| 2012/0242381 | A1 | 9/2012 | Anastasov et al. | |
| 2014/0029316 | A1* | 1/2014 | Adragna | H02M 3/33523 363/21.18 |
| 2016/0261201 | A1* | 9/2016 | Tao | H02M 3/33523 |

FOREIGN PATENT DOCUMENTS

DE    102011108563 A1    12/2011

* cited by examiner

*Primary Examiner* — Timothy J Dole
*Assistant Examiner* — Ishrat Jamali
(74) *Attorney, Agent, or Firm* — Slater Matsil, LLP (57) ABSTRACT

An example relates to a method for operating a converter comprising (i) determining whether a valley for switching the converter in a quasi-resonant mode is available within a predetermined time range; (ii) selecting the valley if it is available within the predetermined time range; and (iii) changing the mode for operating the converter if the valley is not available within the predetermined time range.

35 Claims, 7 Drawing Sheets

Fig.8

CONVERTER WITH QUASI-RESONANT MODE OF OPERATION FOR SUPPLYING POWER TO A LOAD

TECHNICAL FIELD

Embodiments of the present invention relate to a converter for supplying power to a load.

SUMMARY

Embodiments of the present invention in particular relate to converters as they may be used in switching mode power supplies (SMPSs) and/or in pulse-width modulation (PWM) applications. A converter may in particular allow dimming of a lighting device, application or system.

A first embodiment relates to a method for operating a converter. In this method it is determined whether a valley for switching the converter in a quasi-resonant mode is available within a predetermined time. The mode for operating the converter is changed if the valley is not available within the predetermined time range.

A second embodiment relates to a method of operating a converter that includes a transformer, a transistor controlling the current through a primary side of the transformer, and a control unit for controlling the switching of the transistor to generate current pulses in the transformer. The method includes receiving a feedback signal. Based on the feedback signal, it is determined whether a valley for switching the converter in a quasi-resonant mode is available within a predetermined time range. The mode for operating the converter is changed if the valley is not available within the predetermined time range.

A third embodiment relates to a device that includes a transformer a transformer, the transistor controlling a current through a primary side of the transformer, and a control unit for controlling the switching of the transistor to generate current pulses in the transformer. The control unit is configured to receive a feedback signal, to determine, based on the feedback signal, whether a valley for switching the converter in a quasi-resonant mode is available within a predetermined time range, and to change the mode for operating the converter if the valley is not available within the predetermined time range.

A fourth embodiment is directed to a device includes a transformer, a transistor controlling a current through a primary side of the transformer, and a control unit for controlling the switching of the transistor to generate current pulses in the transformer. The control unit comprises means for receiving a feedback signal, means for determining, based on the feedback signal, whether a valley for switching the converter in a quasi-resonant mode is available within a predetermined time range, and means for changing the mode for operating the converter if the valley is not available within the predetermined time range.

A fifth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF ILLUSTRATIVE EMBODIMENTS

Power supplies may use different modes of operation to cover a wide range of output conditions (also referred to as load conditions) and input conditions in particular in view of an optimized efficiency. Such "multi-mode operation" may comprise a continuous conduction mode (CCM);
a quasi-resonant mode (QRM);
a discontinuous conduction mode (DCM); and
an active burst mode (ABM).

Especially for lighting applications, an abrupt transition of the output power due to a change of operation is unwanted. Such transition results in an over- or undershoot of the output voltage and/or the output current which is perceivable as flickering of the lighting device.

Figure 1:
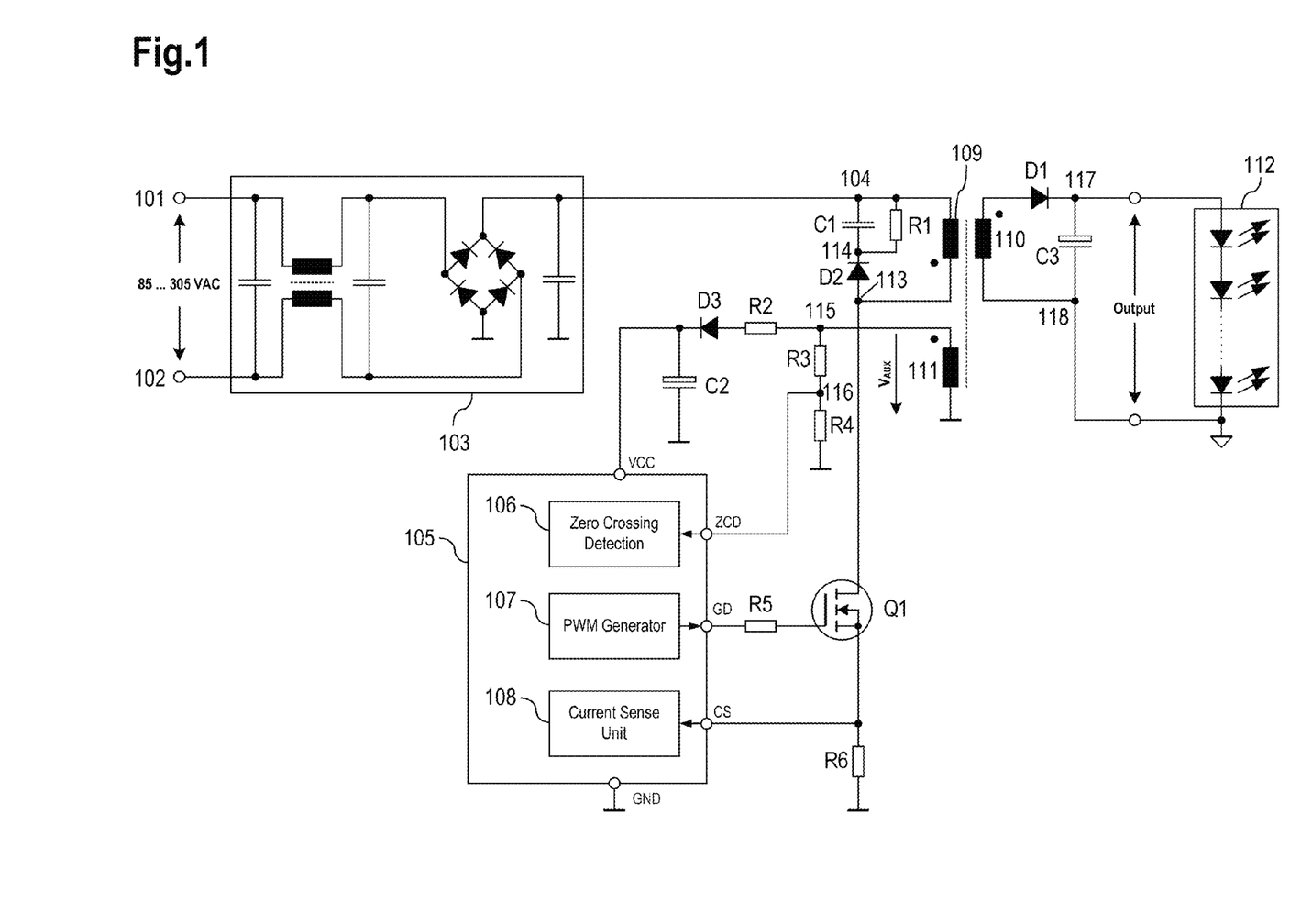
FIG. 1 shows a schematic circuitry of a flyback converter that may be used for dimming applications.

FIG. 1 shows a schematic circuitry of a flyback converter comprising a n-channel MOSFET Q1 as an exemplary electronic switch and a PWM control 105 comprising a zero crossing detection 106, a PWM generator 107 and a current sense unit 108. The zero crossing detection 106 receives a signal via a terminal ZCD, the PWM generator 107 controls the gate of the MOSFET Q1 via a terminal GD (gate driver) and the current sensing unit 108 receives a signal via a terminal CS. Also, the PWM control 105 comprises a terminal VCC for a supply voltage (of the PWM control) and is connected to ground. Also, a transformer is provided comprising a primary winding 109, a secondary winding 110 and an auxiliary winding 111. It is noted that the primary winding 109, the secondary winding 110 and the auxiliary winding 111 may each comprise one or several windings.

An AC input signal (amounting to e.g., 85 VAC to 305 VAC) can be connected to terminals 101 and 102. The AC input signal is then processed by a rectifier 103 and a DC signal output by the rectifier 103 is conveyed to a node 104. The node 114 is connected via a capacitor C1 to a node 114 and the node 114 is connected via a diode D2 to a node 113. The cathode of the diode D2 is directed towards the node 114. A resistor R1 is arranged in parallel to the capacitor C1. The primary winding 109 is connected between the nodes 104 and 113.

The node 113 is connected to the drain of the MOSFET Q1. The source of the MOSFET Q1 is connected via a resistor R6 to ground. The source of the MOSFET Q1 is also connected to the terminal CS. The terminal GD is connected via a resistor R5 to the gate of the MOSFET Q1.

The auxiliary winding 111 supplies an auxiliary voltage $V_{AUX}$ to a node 115. The node 115 is connected via a series connection comprising a resistor R2 and a diode D3 to the terminal VCC of the PWM control 105, wherein the cathode of the diode D3 points towards the terminal VCC. A capacitor C2 is connected between the terminal VCC and ground.

The node 115 is connected via a resistor R3 to a node 116 and the node 116 is connected to the terminal ZCD. Also, the node 116 is connected via a resistor R4 to ground. Hence, the auxiliary winding, via the resistors R3 and R4, supplies the zero crossing signal to the terminal ZCD of the PWM control 105.

One side of the secondary winding 110 is connected via a diode D1 to a node 117, wherein the cathode of the diode D1 points toward the node 117. The other side of the secondary winding 110 is connected to a node 118. A capacitor C3 is connected across the nodes 117 and 118 and a load 112 is connected in parallel to the capacitor C3. In the example shown in FIG. 1, the load comprises a series connection of light emitting diodes (LEDs).

Figure 2:
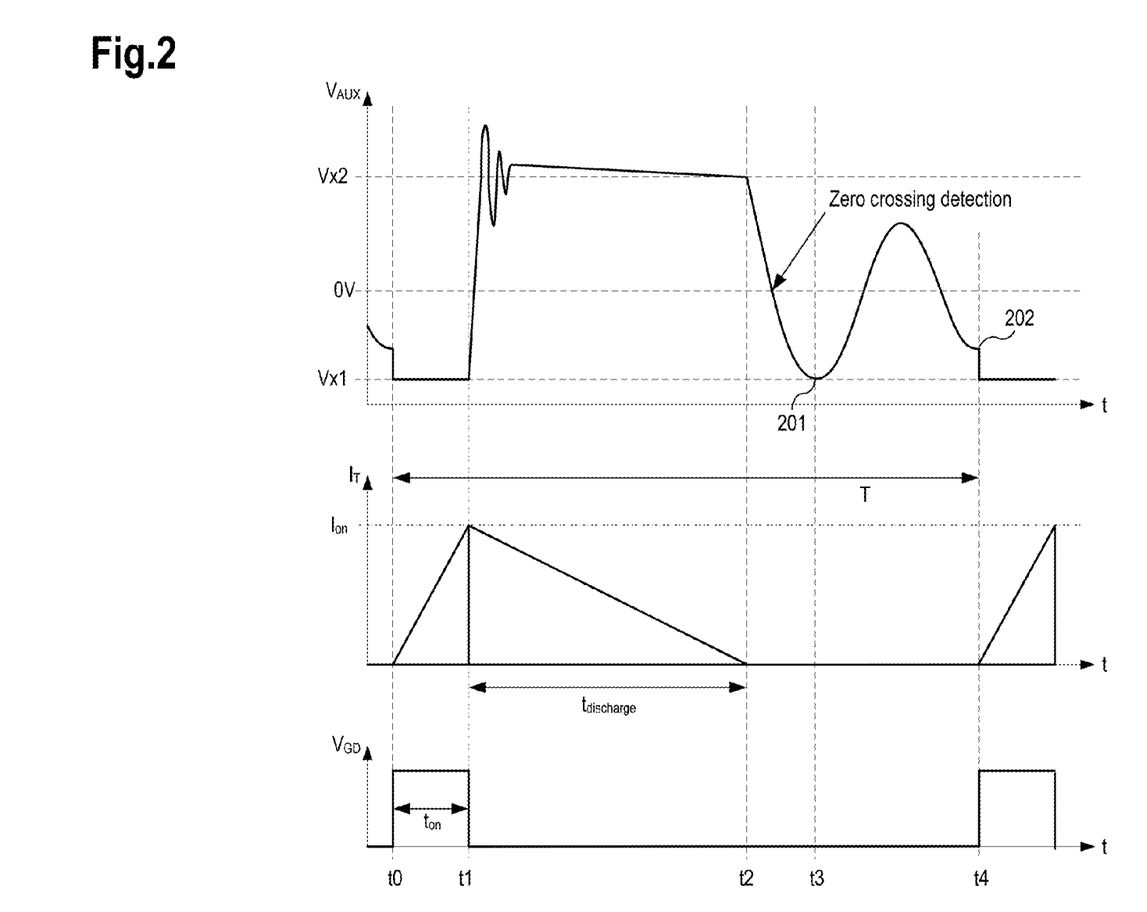
FIG. 2 shows a signal diagram comprising a feedback signal derived from the auxiliary winding shown in FIG. 1, a current at the transformer shown in FIG. 1 and a switching cycle of the switching element shown in FIG. 1.

FIG. 2 shows a signal diagram comprising a feedback signal (auxiliary voltage $V_{AUX}$) derived from the auxiliary winding shown in FIG. 1, a current $I_T$ at the transformer shown in FIG. 1, a voltage $V_{GD}$ at the terminal GD and a switching cycle of the switching element shown in FIG. 1. In the flyback topology of FIG. 1, the current during an on time $t_{on}$ refers to the current on the primary side in coil 109, whereas the discharge current during a discharge time $t_{discharge}$ refers to the secondary side in coil 110.

At a time t0, the MOSFET Q1 is switched on for a duration $t_{on}$, i.e. the MOSFET is switched off at a time t1 as is shown by the signal $V_{GD}$ applied to the terminal GD. During this time $t_{on}$, the current at the primary side of the transformer (i.e. the current through the primary winding 109) increases from zero to $I_{on}$. After the time $t_{on}$, this current becomes 0 very quickly and the discharge current starts to flow in the coil 110, decreases and reaches zero at a time t2 (i.e. the power is transferred from the primary side to the secondary side of the transformer). The interval between t1 and t2 can be referred to as discharge interval $t_{discharge}$.

The auxiliary voltage $V_{AUX}$ is on a level Vx1 during the time $t_{on}$. Starting at the time t1, the auxiliary voltage $V_{AUX}$ increases according to $$V_{AUX} = -V_{in} \cdot \frac{N_{AUX}}{N_{PRI}},$$

wherein $V_{in}$ is an input voltage at the node 104, $N_{AUX}$ is the number of turns (windings) of the auxiliary winding 111 and $N_{PRI}$ is the number of turns (windings) of the primary winding 109.

After transistor Q1 is switched off, the auxiliary voltage $V_{AUX}$ increases until it reaches at the time t2 a voltage Vx2 according to $$Vx2 = V_{out} \cdot \frac{N_{AUX}}{N_{SEC}},$$

wherein $V_{out}$ is an output voltage at the node 117 and $N_{SEC}$ is the number of turns (windings) of the secondary winding 110. Due to parasitic elements in the circuit, it may oscillate for a short duration when the current through the coil 109 stops and the current through the coil 110 starts after the transistor Q1 has been switched off.

At the time t2, the current through the coil 110 has reached 0 and the diode D1 starts blocking. Due to the transformer main inductance and parasitic elements in the circuitry, e.g., the output capacitance of the transistor Q1 and transformer winding capacitance, the auxiliary voltage $V_{AUX}$ starts oscillating around 0V with decreasing amplitude. The voltage $V_{AUX}$ represents the voltage at the drain of the transistor Q1.

This oscillation is also referred to as zero crossing oscillation, which has a number of subsequent valleys. The valley may be used for again switching-on the MOSFET, i.e. the transistor Q1.

The valleys represent the points in time where the voltage at the drain of the transistor Q1 shows its minimum voltage or even zero voltage. It is advantageous to switch the transistor Q1 on again when the voltage at its drain is at a minimum in order to reduce switching losses. This method is also referred to as valley switching. If the drain voltage at the transistor Q1 amounts to zero, the method is also referred to as zero voltage switching (ZVS). It may depend on input and output voltage whether valley switching becomes ZVS.

In the example shown in FIG. 2, a first valley 201 occurs at a time t3 and a second valley 202 occurs at a time t4. The second valley 202 triggers another switching-on of the MOSFET Q2. Hence, a period (or switching cycle) T lasts from the time t0 to the time t4.

Pulse width modulation (PWM) is used in power supplies to control the voltage, the current or the power to a load. The power supply may be operated by a voltage of, e.g., 115 VAC or 230 VAC.

A PWM signal may comprise at least one of the following parameters:

a repetition frequency (also referred to as switching frequency);

an on-duration (also referred to as on-time) during which the PWM switch (the MOSFET Q1 in the example shown in FIG. 1) is switched on;

an off-duration (also referred to as off-time) during which the PWM switch is switched off;

a duty cycle (pulse/pause ratio or duty ratio) determined by the on-duration and the switching frequency.

These parameters determine the power that is supplied towards the load. The PWM control 105 is preferably arranged to ensure that the parameters of the PWM control correspond to the power required by the load. The PWM control 105 may determine this amount of power based on a current flowing through or towards the load 112 or based on a power at the load 112. As the PWM may react with some delay, the buffer capacitor C3 may be provided in parallel to the load 112.

There are various possibilities to select the parameters for a particular amount of power required by the load 112. Additional requirements may have to be fulfilled by the power supply, e.g.:

the switching frequency may have to be above a certain threshold to avoid noises that may be perceived as disturbing to the human ear;

the switching frequency may also have to be below another threshold to maintain electromagnetic compatibility and to limit switching losses;

a wide load range may have to be supported;
a wide range of supply voltage may have to be supported;
internal losses may need to be low;
the PWM control itself may need to be stable and robust.

At least one of the above may be a requirement for an efficient PWM system. On the other hand, it may also be an objective to keep power consumption and complexity of the PWM system low.

Two aspects may be considered with regard to switching losses:

a switching frequency, i.e. how many times the gate capacitance of the switch gets charged and discharged which corresponds to how many times the switch blocks or becomes conductive; and a voltage at the drain connection of the switch (zero voltage switching ZVS).

The switching losses may be reduced, in particular minimized in case the switching frequency is not at a minimum, but at a frequency that still allows for ZVS.

An exemplary implementation is a fixed frequency DCM PWM system. Here, at the beginning of the switching period no current is conveyed. After being switched on, the current starting at zero continuously grows; when a predetermined maximum current is reached, it is switched off. The peak current changes to control the load; this is also referred to as peak current control or current mode.

Similarly, instead of the peak current, the on-time and hence the pulse duty ratio may be changed to control the load; this is also referred to a as duty-cycle control or voltage mode.

As an alternative, a switching-on time or peak current and hence the pulse duty ratio may be predefined. The switching frequency changes to control the load. The switching frequency control range may then be defined such that the next period starts current-less.

Such DCM approach bears the following disadvantages:

Switching-on losses: switching-on occurs at a high voltage; current-less switching results in a high voltage at the inductor (or transformer).

Magnetization losses: supplying energy for a big load requires a high amount of magnetic flux at the inductor/transformer, which is fully degraded until the next switching-on.

Limited mode of operation: a low supply voltage and a high load require high switching frequencies to convey the energy towards the load; this may not be an option, because in DCM the next switching cycle is required to start with zero current.

Another option is a fixed frequency CCM/DCM PWM system, which covers a larger mode of operation. In this case, the current of the inductor/transformer may be larger than zero at the start of the next switching cycle. The current profile (current over time) may not be periodic. The magnetization losses are lower than in the previous system, because the magnetic flux does not always have to revert to zero. The switching frequency may be adjusted pursuant to the required power and/or according to the supply voltage.

A disadvantage of this approach are the switching-on losses, because a transformer current is not zero at a turn-on of the switch. The CCM in peak current control can become instable, because when the switch is switched on again the level of the current in the transformer may change from switching cycle to switching cycle (contrary to QR or DCM operation, where this current starts from a 0 level).

Switching-on losses may be reduced by the QRM. The QRM differs from the fixed-frequency DCM, because the time between active switching phases (current-less gaps) is adjusted to the parasitic oscillation of the system. Also, the switching frequency may be variable.

Figure 8:
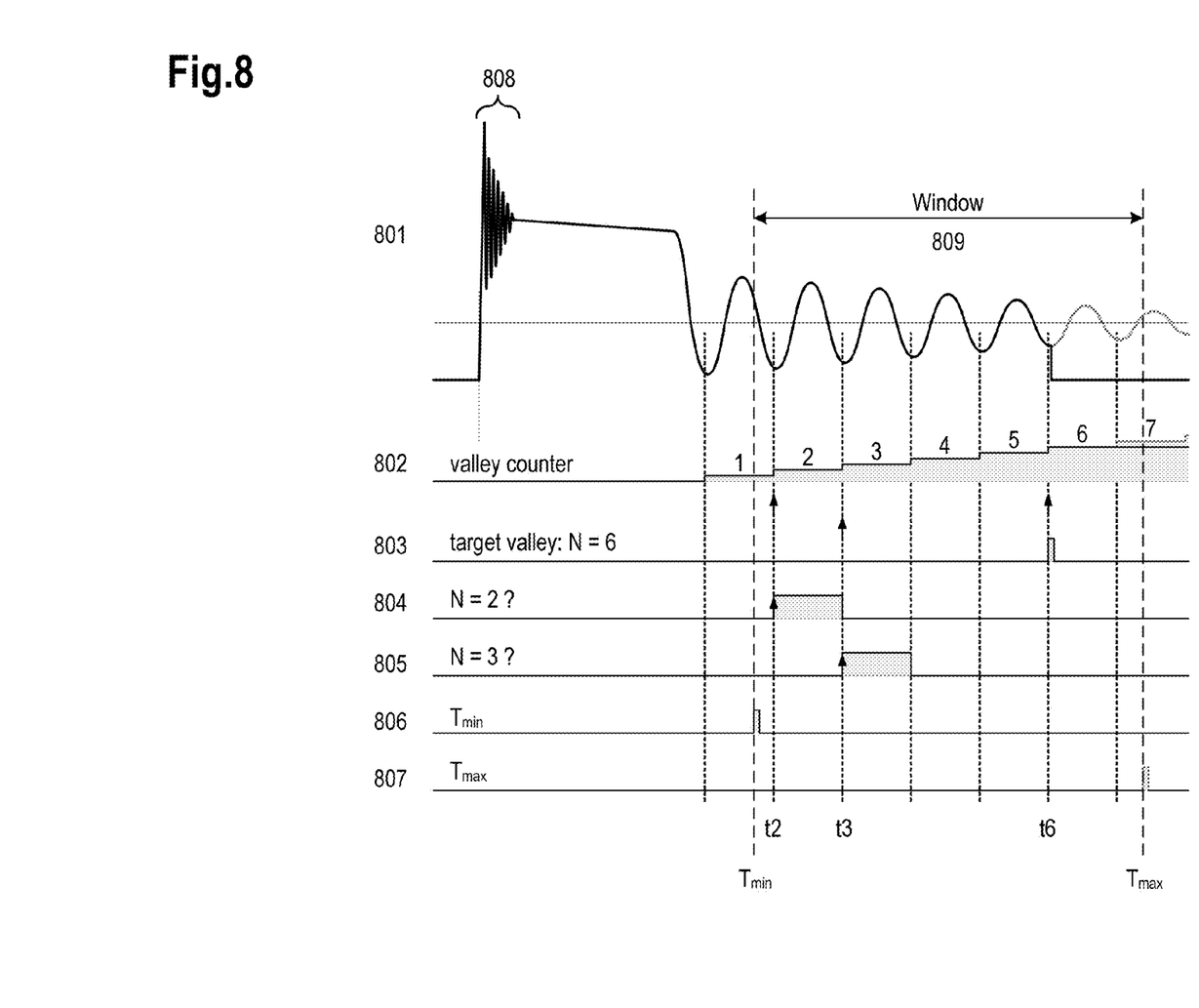
FIG. 8 shows a schematic diagram with an auxiliary voltage $V_{AUX}$ signal (which can be observed via the auxiliary winding shown in FIG. 1) comprising zero crossing oscillation which leads to several valleys that may be used for valley switching in QRM.

Because of parasitic capacitors, switching-on as well as switching-off results in decaying oscillations (see auxiliary voltage $V_{AUX}$ as shown in FIG. 2 or in FIG. 8). The voltage at the pulse-width modulated switch is subject to such decaying oscillations, which are also referred to as switching oscillations.

Depending on the mode of operation, after switching-off the current in the inductor/transformer may reach zero (this moment is also referred to as zero crossing). After the zero crossing (of the current) a decaying oscillation around zero may occur (zero crossing oscillation). Switching losses of the switch are low if the switch is switched on in a valley of the zero crossing oscillation; this is also referred to as valley switching.

In QRM the switch is switched on in the first valley or in a subsequent valley of the zero crossing oscillation.

However, the switching frequency may depend on the input voltage and on the power required by the load.

The switching frequency increases with an increase of the input voltage and with a decrease of the load. The switching frequency can be reduced by using a subsequent valley of the zero crossing oscillation. The switching frequency can be increased by using an earlier valley of the zero crossing oscillation.

In case of a high load and a low voltage using the first (earliest) valley may result in a switching frequency that is too low to convey the energy necessary towards the load. In addition, subsequent valleys may be less strong, switching-on losses may hence increase.

A valley may be detected via the voltage at the switch or via the voltage across an auxiliary winding of the inductor/transformer. It may be an option to detect the zero crossing of the voltage across the auxiliary winding instead of the valley itself. The valley may be assumed to follow such zero crossing after a predetermined amount of time.

The QRM is beneficial considering switching-on losses. However, the QRM system may in particular have the following disadvantages:

The operation mode supported by the QRM is reduced in comparison to the fixed frequency DCM, because of the requirement to detect at least one valley.

The switching losses per cycle may be low, but high switching frequencies or high switching currents may significantly contribute to the overall losses of the QRM.

Changing the valleys leads to changes in the switching frequencies which may irritate the PWM control of the load (after changing the valleys, e.g., using the third instead of the first valley, PWM parameters of the PWM control are affected, which may not match the resulting change in the switching frequency). This may lead the PWM control to jitter between different valleys back and forth.

According to an embodiment, QRM, DCM and CCM may be combined. The QRM may require a functionality which may restart the PWM control in case no zero crossing is detected for a predetermined amount of time. A threshold for a maximum amount of time may be set for the switching-on time or the switching-off time of the electronic switch. In case the threshold applies for the switching-on time, the reciprocal of the maximum waiting time corresponds to a minimum switching frequency.

Hence, a timer (also referred to as QR-timer or timer unit) may be provided together with a timer control. This timer defines the points in time where a new switching cycle is started (the time t0 in FIG. 2) and may be configured to define also when the transistor Q1 is switched off (the time t1 in FIG. 2).

A new switching cycle may be started in a first, second, third, etc. (in general: an N-th) valley of the zero crossing oscillation. If the selected valley N does not occur within a maximum waiting period $T_{max}$, a new switching cycle is started at $T_{max}$; however, if the selected valley occurs before a minimum waiting period $T_{min}$, the new switching cycle is not started before $T_{min}$. It is another option to (also) start the new switching cycle via an external trigger (e.g., via software or via a signal applied to a particular pin of an integrated circuit).

When the new switching cycle is started, the electronic switch (e.g., the MOSFET Q1 in FIG. 1) is switched on.

The timer control may be informed about the count of the valleys after the minimum waiting period $T_{min}$ and/or after the maximum waiting period $T_{max}$.

Also, the timer control may be informed whether the minimum waiting period $T_{min}$ and/or the maximum waiting period $T_{max}$ were not reached or exceeded.

It is noted that the minimum waiting period $T_{min}$ (corresponding to a maximum switching frequency of the electronic switch in QRM) and the maximum waiting period $T_{max}$ (corresponding to a minimum switching frequency in QRM) may define a time range. Within this time range, no or at least one valley may be located that may be selected for valley switching in QRM. Based on the on-time $t_{on}$ of the electric switch, the input voltage and the load, the valleys within this time range may change their position. A valley N selected may thus
- occur before the minimum waiting period $T_{min}$,
- fall within the time range (i.e. occur after $T_{min}$ and before $T_{max}$) or
- occur after the maximum waiting period $T_{max}$ is over.

For valley-detection purposes a valley counter may be used as follows:

(1) The valley counter is initialized with zero before the first valley is expected, e.g., (some time) after the switch has been switched off.

(2) The valley counter is incremented when a valley has occurred.

The timer control may comprise the following features:

(1) A decision about the selection of the valley may depend on
- the valley previously selected;
- the expected occurrence time $T_N$ of the valleys N=1, . . . , $N_{max}$;
- the minimum waiting period $T_{min}$;
- the maximum waiting period $T_{max}$;
- the valley counter at the time when the minimum waiting period $T_{min}$ is over; and
- the valley counter at the time when the maximum waiting period $T_{max}$ is over.

(2) The maximum waiting period $T_{max}$ and the minimum waiting period $T_{min}$ may be determined based on the mode of operation, e.g.,
- based on a switching-on time or based on a peak current, which is controlled by the PWM control;
- based on additional PWM parameters.

(3) At least one PWM parameter (e.g., peak current) may be selected (e.g., via a control loop) in order to supply the load in addition to other parameters, e.g., error signal, previous error signals, previous parameters (e.g., previous peak currents):
- the minimum waiting period;
- the maximum waiting period;
- the valley selected.

The timer control may consider all such parameters or only a portion thereof. The timer control may apply the parameters for each switching cycle or for less than a single switching cycle. The parameters may be applied based on parameters measured during the previous switching cycle and/or during at least one earlier switching cycle.

The examples presented bear in particular the following advantages:

(1) The thresholds set by the waiting periods in relation to the operation modes (load and/or supply voltage) may determine a time range for the switching periods, which reduces the losses of the power supply.

(2) Depending on the switching period and if applicable due to the switching period, the QRM is chosen (which is favorable in view of the switching-on losses). The overall operation mode, however, may be extended by the additional operation modes DCM and CCM.

(3) As the PWM control also takes the mode of operation into account, a robust and stable operation can be ensured across the various modes of operation.

(4) In addition, (too) frequent changes of modes of operation (in particular between different selections of valleys) may be avoided.

Hence, the examples provided in particular allow adjusting the frequency limits to the mode of operation. Reaching a frequency limit may be a criterion for changing the valley. It may be an option to select the adjacent valley (if such valley exists) or it may be an option directly select the matching valley.

Embodiments may refer to all kinds of flyback converters, boost converter, buck converter or inverter. Also, the solution may apply to any topology which is based on a magnetic flux building up in a first switching state, dissipating in a second switching state, wherein the magnetic flux does not fall below zero and wherein reaching zero results in an oscillation at the switch.

In a controlled power supply, the control unit determines an error signal based on a load parameter (e.g., a voltage, current or power). The error signal is used to calculate a parameter, e.g., a peak current or a switching-on time. The rule to calculate the parameter may be realized via a I-type controller, a PI-type controller and/or a PID-type controller, which may be supplied by (e.g., low-pass) filters and phase controlling circuitry. The parameter may be used to determine the range of switching period (minimum waiting period and maximum waiting period).

Figure 3:
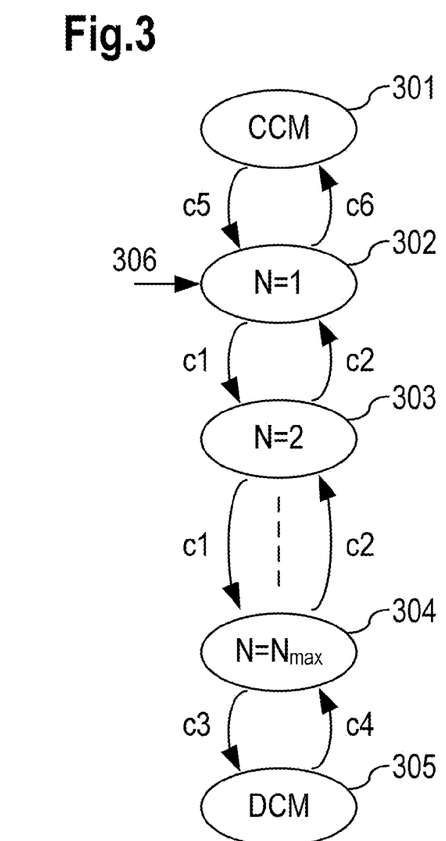
FIG. 3 shows an exemplary state machine illustrating a selection of a valley N.

FIG. 3 shows an exemplary state machine illustrating a selection of a valley N. At the beginning an initial state 302 for a valley N=1 may be set (see arrow 306). The state machine further comprises a state 303 corresponding to a valley N=2 and a state 304 corresponding to a valley N=$N_{max}$. It is noted that several states may be provided between the state 303 and the state 304. The states 302 to 304 refer to QRM utilizing valley switching. In the state 302 a maximum power is conveyed to the load—with the highest switching frequency possible in QRM; accordingly, the state 304 leads to a minimum switching frequency that can be used in QRM.

The conditions c1 and c2 utilized in QRM can be summarized as follows:

c1: If the minimum waiting period $T_{min}$ has not been reached when valley N has been detected and the number of the valley N has not yet reached a predetermined maximum value $N_{max}$, the number of valley N can be incremented.

c2: If the maximum waiting period $T_{max}$ is exceeded and valley N has not been detected and N is larger than 1, the number of valley N can be decremented.

Otherwise, the number of valley N may remain unchanged.

In case the state 304 has been reached and less power should be conveyed toward the load, DCM instead of valley switching may be used. As an option, the switching-on time $t_{on}$ may be kept constant, but the switching period T may be increased. This corresponds to a condition c3 leading from the state 304 to a state 305.

Accordingly, a condition c4 leads from the state 305 back to the state 304 in case DCM can be left and QRM can be entered. In this regard, the condition c4 may utilize QRM with the valley $N=N_{max}$.

In case the state 302 has been reached and more power should be conveyed toward the load, CCM instead of QRM may be used. This corresponds to a condition c6 leading from the state 302 to a state 301.

Accordingly, a condition c5 leads from the state 301 back to the state 302 in case CCM can be left and QRM can be entered. In this regard, the condition c5 may utilize QRM with the valley N=1.

It is noted that the transition between the states may be based on a dimming request and/or a change of the load. For example, a user may require a lighting device (as a load) to emit more or less light; accordingly, the power corresponding to such dimming request is conveyed towards the load by using different states of this state machine and in particular different modes, e.g., QRM, CCM or DCM.

The example presented in FIG. 3 suggests choosing adjacent valleys in QRM by incrementing or decrementing the number of valley (if this is admissible within a predefined time range limited by the minimum waiting period $T_{min}$ and the maximum waiting period $T_{max}$). It is also an option in QRM to be aware of the actual number of valley N as well as of the valleys available within the predefined time range. In such case, dependent on a load or dimming situation, the valley may be directly selected.

It is also an option to consider which valley has already occurred when the waiting period is reached: In case the minimum waiting period has not been reached, the value of the valley counter at the time when the minimum waiting period was over can be used and incremented.

However, if the maximum waiting period has been exceeded, the value of the valley counter at the time when the maximum waiting period was over may be used.

In this embodiment, the minimum value for the valley N=1 and a predetermined maximum value for the valley (which can still be considered as a significant valley) can be considered.

The parameters of the PWM control may be adjusted depending on the mode of operation; the following modes of operation may be determined:

the CCM if the maximum waiting period $T_{max}$ is exceeded and if N=1;

the DCM if the minimum waiting period $T_{min}$ is exceeded and N has the maximum value admissible $N_{max}$ (highest valley count);

the QRM in any other case, i.e. if no waiting period is violated or if N is between 1 and the maximum value admissible.

A change of mode of operation may comprise at least one of the following:

changing the selected valley either by changing the valley immediately or by gradually changing the switching period from one selected valley to another using a time delay referring to time 0 or the time of the valley's occurrence; and starting a new switching cycle at a defined time related to the predetermined time range.

It is noted that incrementing herein in particular refers to an increment by one and decrementing in particular refers to a decrement by one.

Figure 4:
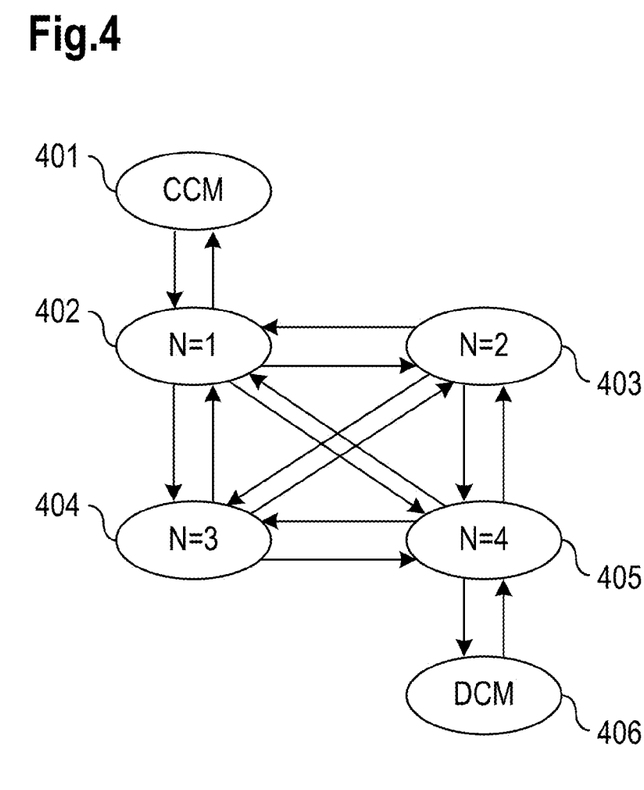
FIG. 4 shows an alternative exemplary state machine illustrating a direct selection of a valley N, wherein $N_{max}=4$.

FIG. 4 shows an alternative exemplary state machine illustrating a direct selection of a valley N, wherein N in this example is one out of four, i.e., $N_{max}=4$. Of course, different scenarios may apply with a different number of valleys to be considered. For example, $N_{max}$ may be 9 or 11, etc. The change of the state machine to other values of $N_{max}$ is applicable accordingly.

In the example according to FIG. 4, the QRM may use valley switching within one of the valleys N=1 to N=4 depicted by the QRM states 402 to 405. From each of the QRM states, any of the other QRM states may be selected according to the following rules:

(1) In case the selected valley N is within the time range determined by the minimum waiting period $T_{min}$ and the maximum waiting period $T_{max}$ no state change may be required.

(2) In case the selected valley N is below the minimum waiting period $T_{min}$, a rule A applies.

(3) In case the selected valley N is above the waiting period $T_{max}$, either the rule A or a rule B applies.

The rules A and B can be defined as follows:

Rule A: At the minimum waiting period $T_{min}$, the valley counter indicates a valley $N_{Tmin}$. In order to convey the highest possible energy in QRM (maximum switching frequency in QRM), a valley $N_{Tmin}+1$ after the valley $N_{Tmin}$ is selected. This valley $N_{Tmin}+1$ occurs after the minimum waiting period $T_{min}$ and hence lies within the time range.

Rule B: At the maximum waiting period $T_{max}$, the valley counter indicates a valley $N_{Tmax}$, which is the last valley before this time $T_{max}$. Hence, the valley $N_{Tmax}$ can be selected to lie within the time range and to convey the minimum amount of energy according to the minimum switching frequency in QRM.

This is an example to directly select the valleys $N_{Tmin}+1$ or $N_{Tmax}$, which may be possible because of a valley counter and a register (or any kind of memory) storing the time at which the respective valley $N=1 \ldots N_{max}$ occurs. Being aware of the borders of the time range, i.e. $T_{min}$ and $T_{max}$, as well as the time of each of the valleys $T_1, \ldots, T_{Nmax}$ allows selecting a suitable valley within QRM as shown by the state transitions between the states 402 and 405 of FIG. 4.

In addition, as already shown in and explained with regard to FIG. 3, if the state 402 (QRM utilizing the valley N=1) is not suitable to convey a sufficient amount of energy towards the load, a transition to a state 401 may be conducted utilizing CCM. Also said state 401 may be left and QRM (e.g., state 402) may be re-entered in case CCM is no longer required. Accordingly, if QRM in state 405 still conveys too much energy towards the load, a DCM (state 406) may be entered. This state 406 may be left and a QRM state (e.g., state 405) may be re-entered in case the load requires more energy.

FIG. 8 shows a schematic diagram with an auxiliary voltage $V_{AUX}$ signal 801 (which can be observed via the auxiliary winding 111 as shown in FIG. 1) comprising zero crossing oscillation which leads to several valleys that may be used for valley switching in QRM.

The valleys may be detected via a zero crossing detection, because some time after the actual zero crossing a valley can be expected. Hence, the zero crossing may be detected and a filter may provide a delay which leads to the valley.

It is noted that valley detection or valley switching as referred to herein does not have to be restricted to the mathematically exact point of the valley. The valley does instead refer to a range of potentially promising switching points that may be in the area of the valley. Hence, the valley detection based on the zero crossing detection may lead to a "valley" that does not have to be the exact minimum, but instead be a favorable point at or near such minimum.

Based on the zero crossings of the oscillation of the $V_{AUX}$ signal 801 (after a ringing period 808 is over), a valley counter 802 (e.g., a register) may indicate an actual count of the valleys, in FIG. 8 from 1 to 7.

As an example a register comprises the selected valley N=6 and a signal 803 provides a rising edge in case the value of this register (i.e. N=6) corresponds to the value of the valley counter 802.

Also, a register M0 and a register M1 are provided, wherein in each of the registers M0 and M1 a number of a valley to be measured may be stored. In one embodiment, the values may be fixed and defined by a hardware; in another embodiment, the values may be defined by a control algorithm and they may change during run-time depending on the operating mode.

A signal 804 indicates via a rising edge if the value stored in the register M0 corresponds to the value of the valley counter 802 and another register stores the time of this event (i.e. the value of a timer is captured with the rising edge of the signal 804). A signal 805 indicates via a rising edge if the value stored in the register M1 corresponds to the value of the valley counter 802 and a further register stores the time of this event (i.e. the value of a timer is captured with the rising edge of the signal 805). In the example shown in FIG. 8, the register M0 is set to 2 and the register M1 is set to 3. In another embodiment, the valleys 1 and 2 may be used as base for valley timing. It is also an option that valley N=x (with x>1) is selected for at least one switching cycle to allow an update of the measurement of the oscillation period although valley N=1 was selected.

Hence a time t2 and a time t3 are stored in the respective registers and can be used for further processing. For example, being aware of the time difference $$\Delta t = t3 - t2$$

allows a processing unit to determine the time of the subsequent (and/or previous) valleys according to $$tN = t3 + (N-3) \cdot \Delta t,$$

where $\Delta t$ represents the oscillation period. This oscillation period $\Delta t$ may also be used to finetune the delay between the zero crossing of the oscillation and a point in time when a new switching cycle starts.

For example, the valley N=6 occurs at the time $$t6 = t3 + 3 \cdot \Delta t.$$

This approach allows determining the time each valley occurs via merely two registers. As an alternative, more than two registers can be used for storing the time when at least three valleys occur. In may be an option to store such time for each valley up to (including) the valley $N_{max}$.

A time range 809 is defined as a time between the minimum time $T_{min}$ and the maximum time $T_{max}$. In one embodiment, the time 0 is considered as the start of a new switching cycle. In another embodiment, the time 0 is considered as an end of the gate driver activation time. In further embodiment, the time 0 is considered as an event resulting from the switching of the gate driver, such as the first occurrence of a valley information or a zero-current indication. The minimum time $T_{min}$ and the maximum time $T_{max}$ may be adapted depending on the operation conditions.

As an option, the time range 809 may comprise a plurality of n subranges (with i=1 . . . n). A subrange i is defined as a time between the minimum time $T_{min,i}$ and the maximum time $T_{max,i}$. Several minimum times $T_{min,i}$ and maximum times $T_{max,i}$ may overlap.

Depending on the type of event or start of time, at least one subrange may be selected as an actual subrange. Depending on the operating mode of the device, at least one of the minimum times and at least one of the maximum times may be selected.

At a rising edge of a signal 806 the actual value of the valley counter 802 is stored (e.g., in a register) and at a rising edge of a signal 807 the actual value of the valley counter 802 is stored (e.g., in a register).

As the target valley N=6 lies within the time range 809, the rising edge of the signal 803 selects the valley that is used for valley switching. Hence, at the time t6 the switching element (e.g., MOFET Q2 in FIG. 1) is switched on.

Examples of switching between QRM and DCM will now be discussed.

Examples presented herein in particular suggest changing, e.g., seamlessly, between QRM and DCM. It is in particular proposed to switch seamlessly from an on-time control loop in QRM to a switching-period control loop in DCM and vice versa.

Such an approach can also be used for a peak-current control in QRM instead of an on-time control.

According to an example, two control loops may be used: In QRM, an on-time (or the peak-current) control is used, because in QRM the switching period depends on the on-time or the peak current. Depending on the output power required and the input voltage, the control loop may adjust the on-time (or the peak-current).

In DCM, a switching-period control may be used; in DCM, the on-time (or the peak-current) and/or the switching period may be adjusted freely. In an example, a minimum on-time (or a minimum peak current) are defined for operation in DCM. The actual values of these minimum values may depend on the components (e.g., the gate driver turns the transistor Q1 correctly on and off, or the voltage drop at the shunt resistor R6 is high enough to be detected without noise interference).

Figure 5:
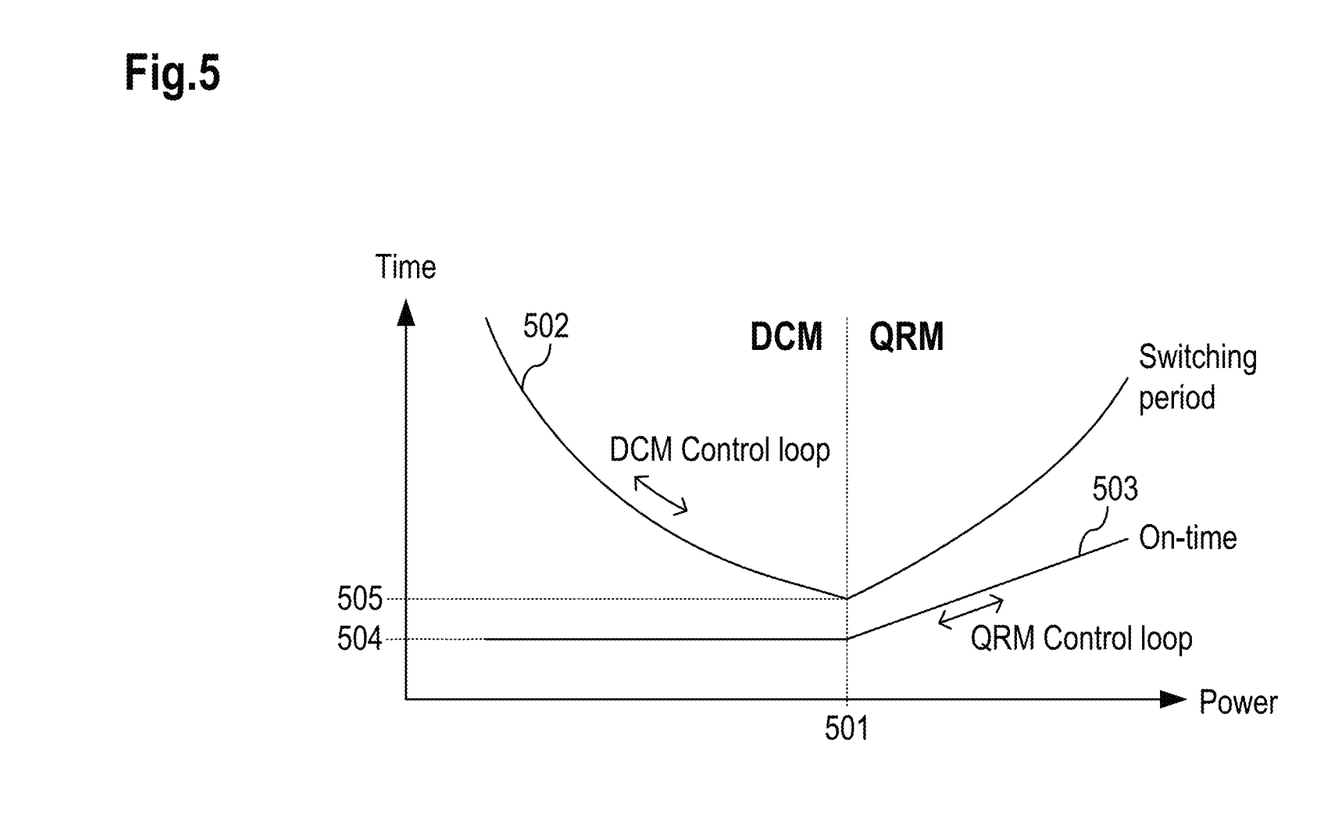
FIG. 5 shows a schematic diagram visualizing a time over a power conveyed towards a load.

FIG. 5 shows a schematic diagram visualizing a time over a power conveyed towards a load. Below a power 501 DCM is used and above said power 501 QRM is used for conveying a predetermined amount of power to the load. It is noted that at the power 501 either DCM or QRM can be used.

A curve 502 shows a switching period and a curve 503 shows an on-time of a switching element (e.g., the MOSFET Q1 as shown in FIG. 1).

According to an example presented, parameters in DCM are chosen to achieve a change of mode such that a power-jump is avoided:

(1) In QRM the power transfer to the load can be reduced by reducing the on-time 503 (or the peak-current) down to a predetermined value 504 (e.g., a predetermined minimum). Once such value 504 is reached, the controller may switch to DCM and it may start to increase the switching period 502 (compared to the switching period used in QRM at the power 501) and at the same time maintain the on-time 503 (or the peak-current) at the predetermined value 504.

(2) In DCM the power transfer can be increased by reducing the switching period 502 until a predetermined value (e.g., a predefined minimum) 505 is reached. Then, the controller may switch to QRM and starts to increase the on-time 503 (or the peak-current), which also increases the switching period 502.

This scheme allows the on-time 503 (or peak-current) and the switching period 502 to be seamlessly adjusted without any jump.

However, a critical moment is the transition between DCM and QRM (or vice versa). Considering an AC input voltage, the switching period 502 in QRM is not fixed, but changes depending on the instantaneous input voltage. Thus, there is an ambiguity for the timing of the mode change between DCM and QRM based on the varying input voltage.

Figure 6:
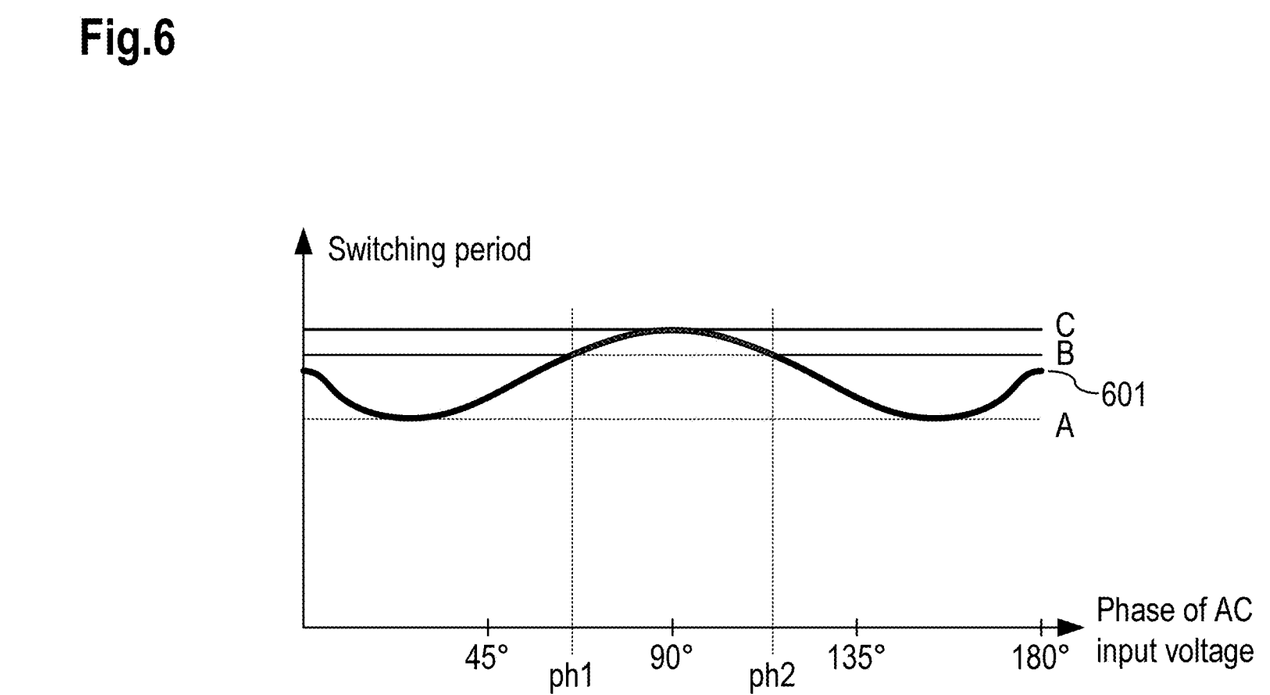
FIG. 6 shows a diagram depicting a duration of a switching period in view of a phase of an AC input voltage.

Typically the AC input voltage is rectified, causing a repetitive scheme for each of the two half waves (every 180° of the AC input cycle). This can be solved, e.g., by a hardware that combines the condition for QRM switching (switching at a valley, with a minimum switching period of $T_{min}$) with a condition for DCM (switching at a period ZTMIN):

FIG. 6 shows a diagram depicting the duration of switching periods in view of a phase of the AC input voltage. The following cases (see curves A to C) may be considered:

(a) If the minimum period ZTMIN is lower (ZTMIN=A) than any switching period 601 which occurs in QRM, the controller may always switch in QRM.

(b) If the minimum switching period ZTMIN is larger (ZTMIN=C) than any switching period 601 which occurs in QRM, the controller will always switch in DCM.

(c) If the minimum period ZTMIN is somewhere in the range (ZTMIN=B) of the switching period which also occurs in QRM, the controller will change automatically between QRM and DCM dependent on the phase of the AC input voltage. In the example shown in FIG. 6, QRM may be used in a range from a phase ph1 to a phase ph2 and DCM outside this phase interval.

This scheme allows to smoothly change the mode of operation from QRM to DCM by ramping up ZTMIN from, e.g., A to C. Vice versa, the mode of operation can be changed from DCM to QRM by lowering ZTMIN from, e.g., C to A.

Figure 7:
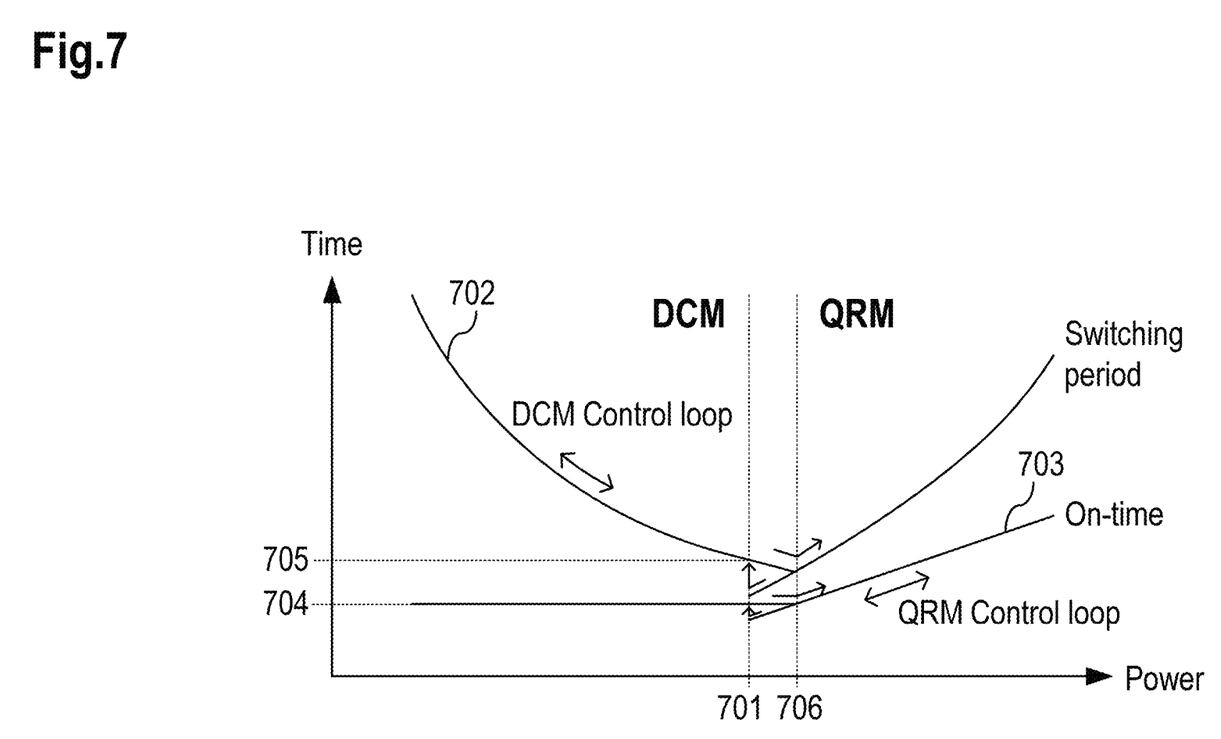
FIG. 7 shows a diagram comprising a hysteresis at the transition between the modes DCM and QRM.

FIG. 7 shows a diagram comprising a hysteresis at the transition between the modes DCM and QRM. This may avoid an unwanted toggling at a single transition point between DCM and QRM. FIG. 7 shows a switching period 702 and an on-time 703 in view of a power conveyed to a load.

In QRM the power can be reduced by decreasing the switching period 702 and the on-time 703 until a power 701 is reached. At that point the DCM can be entered, the switching period 702 may jump to a time 705 and the on-time 703 may jump to a time 704. Further decreasing the power may result in maintaining the on-time 703 at the time 704 and increasing the switching period 702.

In DCM the power can be increased by maintaining the on-time 703 at the time 704 and decreasing the switching period 702 until a power 706 is reached. Then, the QRM can be entered, further increasing the power conveyed to the load by increasing the switching period 702 and the on-time 703.

The area between the power 701 and the power 706 can be reached by via control schemes. Changing from QRM to DCM may occur at the power 701, whereas changing from DCM to QRM may occur at the power 706. This hysteric behavior avoids changing the on-time back-and-forth based on the timing of valleys at the power 501.

The examples suggested herein may in particular be based on at least one of the following solutions. In particular combinations of the following features could be utilized in order to reach a desired result. The features of the method could be combined with any feature(s) of the device, apparatus or system or vice versa.

A method is provided for operating a converter comprising:

determining whether a valley for switching the converter in a quasi-resonant mode is available within a predetermined time range;

changing the mode for operating the converter if the valley is not available within the predetermined time range.

In an embodiment, the method further comprises selecting the valley if it is available within the predetermined time range.

It is in particular an option that changing the mode for operating the converter comprises the step of selecting the valley if it is available within the predetermined time range.

Hence, the converter may utilize valley-switching in the quasi-resonant mode (QRM), wherein the valley selection depends on at least one criterion. In particular, the valley selected is determined to be within such predetermined time range. Otherwise, the mode for operating the converter may change. The change of the mode for operation may occur before or after the end of the current switching cycle.

The converter may be any of the following: a flyback converter, a boost converter, a buck converter or an inverter. The converter may in particular comprise any topology which is based on a magnetic flux building up in a first switching state, dissipating in a second switching state, wherein the magnetic flux does not fall below zero and wherein reaching zero results in an oscillation at the switch.

The converter may in particular comprise a transformer, a transistor (also referred to as switching element, electronic switch or switch) controlling a current through a primary side of the transformer, and a control unit (which may be a PWM control for PWM applications) for controlling the switching of the transistor to generate current pulses (in particular temporary current signals) in the transformer. The converter may be arranged to obtain a feedback signal indicative of a current through the primary side of the transformer and/or indicative of a power drawn by a load from the secondary side of the transformer. Such feedback signal can be used by the control unit for, e.g., zero detection purposes and/or valley switching.

Advantageously, the predetermined time range may determine a range for switching periods which reduces switching losses of the converter. As the converter takes the mode of operation into account, a robust and stable operation can be ensured across various modes of operation.

The converter may be part of a power supply, in particular a switching power supply. The converter may comprise at least one switching element, which is controlled by the control unit. The switching element may be a transistor, a MOSFET, an IGBT, a JFET or the like.

The converter may be used in a pulse-width-modulation (PWM) application, e.g., for lighting devices, applications or systems. Hence, various dimming scenarios can be realized via such converter.

In an embodiment, the valley selected is used for valley switching of the converter in the quasi-resonant mode.

The valleys are part of a zero crossing oscillation after the switching element has been switched off and after the secondary side of the transformer has been conveyed the power to the load (after the discharge is over). One of the valleys of the zero crossing oscillation may be used for switching-on the switching element; this is also referred to as valley switching. It is noted that valley switching may occur at the local minimum or around the local minimum; it does in particular not require to happen at the exact minimum.

In an embodiment, the predetermined time range is at least partially related to a zero crossing oscillation after a switching element of the converter has been switched off.

In an embodiment, the time range is determined by a low threshold and by a high threshold.

The low threshold may be regarded as minimum waiting period $T_{min}$ and the high threshold may be regarded as maximum waiting period $T_{max}$. The predetermined time range may be determined based on a first time after a switch of the converter has been switched off and a second time, which is later than the first time. The low threshold may correspond to a time after a ringing period has substantially decayed.

In an embodiment, the method further comprises:
determining whether the valley for switching the converter in the quasi-resonant mode is available within the predetermined time range by determining whether said valley lies within the time range.

In an embodiment, the method further comprises:
in case the valley occurs before the low threshold, selecting a subsequent valley that lies within the time range.

It is noted that the valley may occur before or at the same time of the low threshold in order to select a subsequent (later) valley.

In an embodiment, the method further comprises:
in case the valley occurs after the high threshold, selecting an earlier valley that lies within the time range.

It is noted that the valley may occur later or at the same time of the low threshold in order to select a previous (earlier) valley.

In an embodiment, selecting the valley is limited by an upper threshold.

The upper threshold may correspond to a highest number of valleys ($N_{max}$) that should not be exceeded. This valley $N_{max}$ may set a limit to ensure that the valleys used have at least a predetermined amplitude (e.g., voltage) that allows detecting valleys and/or efficiently operating QRM.

In an embodiment, selecting the valley is limited by a lower threshold.

Such lower threshold may be the lowest number of a valley to be selected, e.g., the first valley or the second valley after the switching element has been switched off.

In an embodiment, selecting the valley comprises
directly selecting the valley based on an information about the occurrence of the valley.

In an embodiment, the information of the occurrence of the valley is determined based on a time stored in a memory or based on at least two memory entries referring to occurrences of at least two valleys.

Hence, such direct selection of a valley is feasible in case the control unit is aware of the location (time) of the valley to be selected. In one example, the time of occurrence of several valleys may be stored in a memory (e.g., a register for each valley). In another example, the time of occurrence of two valleys are stored in, e.g., two registers. If these valleys are subsequent valleys, a time difference between these occurrences can be determined and, based on this time difference, the occurrence of the other valleys can be calculated. Hence, it can be determined, which valley(s) lie(s) within the predetermined time range of the zero crossing oscillation limited, e.g., by the time range and/or the highest and/or lowest number of valley that should not be exceeded/undercut.

In an embodiment, selecting the valley comprises
incrementally selecting a subsequent valley or decrementally selecting an earlier valley.

Accordingly, an adjacent valley can be selected in a single step. This step may be iteratively applied until the requirements are met, e.g., until the valley is within the predetermined time range or the mode for operating the is (to be) changed.

In an embodiment, changing the mode for operating the converter if the valley is not available within the predetermined time range comprises changing to a time-based operation.

The time-based operation mode may comprise at least one of the following:
restart at a predefined time after a begin of switching cycle;
restart at a predefined time after the switching element is turned off;
restart at a predefined time after an event-related to switching the switching element of the converter, e.g., a valley detection or a zero-current detection.

This operation mode may result in CCM or DCM.

In an embodiment, the mode is entered if no valley is available and the converter needs to provide a high amount of energy towards a load.

CCM is in particular selected if a higher amount of energy is to be conveyed towards the load compared to the energy that can (or shall) be provided in QRM. This may be applicable if the load changes or if a dimming request needs a lighting device (load) to emit more light.

In an embodiment, the discontinuous conduction mode is entered if no valley is available and the converter needs to provide a low amount of energy towards a load.

DCM is in particular selected if a lower amount of energy is to be conveyed towards the load compared to the energy provided in QRM. This may be applicable if the load changes or if a dimming request needs the lighting device (load) to emit less light.

Depending on the switching frequency and if applicable due to the switching frequency, QRM is chosen (which may be favorable in view of the switching-on losses). However, depending on the load situation and/or input voltage situation, other modes, e.g., DCM or CCM, may be used.

Hence, by being able to utilize various modes for operating the converter, a robust and stable operation can be ensured.

In an embodiment, the method further comprises selecting the valley based on a valley previously selected.

In an embodiment, the method further comprises a control loop changing one or more switching parameters depending on an output power and an input voltage.

The switching parameters may comprise at least one of the following: an on-time, an off-time, a peak current and a switching period.

In an embodiment, the method further comprises:
changing the mode for operating the converter from the quasi-resonant mode to a time-based mode by keeping a continuous operation with respect to switching parameters.

This allows the on-time or the peak-current and the switching period to be seamlessly adjusted across the transition between QRM and DCM without any jump. This is in particular of advantage in lighting applications, which require dimming to be continuous without and flickering that might be perceivable to the human eye.

In an embodiment, the method further comprises:

changing the mode for operating the converter from the time-based mode to the quasi-resonant mode by keeping the continuous operation with respect to the switching parameters.

The alternating input signal may be an AC input voltage. If a minimum switching period in DCM is lower than any switching period which occurs in QRM, QRM may be used. On the other hand, if the minimum switching period in DCM is larger than any switching period that occurs in QRM, DCM may be used.

If, however, the minimum switching period $T_{MIN}$ in DCM is somewhere in the range of the switching period that also occurs in QRM, an automatic change between QRM and DCM may be conducted dependent on the AC input voltage.

In an embodiment, the method further comprises:

a hysteresis in the transition between the quasi-resonant mode and the time-based mode.

Also, a method is provided of operating a converter having a transformer, a transistor controlling the current through a primary side of the transformer, and a control unit for controlling the switching of the transistor to generate current pulses in the transformer, the method comprising:

receiving a feedback signal, determining, based on the feedback signal, whether a valley for switching the converter in a quasi-resonant mode is available within a predetermined time range;

changing the mode for operating the converter if the valley is not available within the predetermined time range.

It is noted that the steps of the methods described above may be applicable for this method as well.

In an embodiment, the method further comprises:

selecting the valley if it is available within the predetermined time range.

In an embodiment, the feedback signal is indicative of a current through the primary side of the transformer.

In an embodiment, the feedback signal relates to a power drawn by a load from a secondary side of the transformer.

In an embodiment, the converter is part of a power supply.

A device is suggested, said device comprising a transformer, a transistor controlling a current through a primary side of the transformer, a control unit for controlling the switching of the transistor to generate current pulses in the transformer, wherein the control unit is configured to receive a feedback signal, to determine, based on the feedback signal, whether a valley for switching the converter in a quasi-resonant mode is available within a predetermined time range;

to change the mode for operating the converter if the valley is not available within the predetermined time range.

In an embodiment, the control unit is configured to select the valley if it is available within the predetermined time range.

In an embodiment, the device is a switching mode power supply.

In an embodiment, the control unit is arranged on a single chip or die.

In an embodiment, the control unit is a single integrated device.

In an embodiment, the control unit is coupled to a DC-isolated unit for receiving the feedback signal that is based on a current drawn from a secondary side of the transformer.

In an embodiment, the control unit is coupled to an auxiliary winding of the primary side of the transformer, which provides the feedback signal that is based on a current drawn from a secondary side of the transformer.

In an embodiment, the control unit is configured to change the mode for operating the converter from the quasi-resonant mode to a discontinuous conduction mode by keeping an on-time of the switching element or a peak current constant and by increasing the switching period.

Also, a device is suggested, said device comprising a transformer, a transistor controlling a current through a primary side of the transformer, a control unit for controlling the switching of the transistor to generate current pulses in the transformer, wherein the control unit comprises means for receiving a feedback signal, means for determining, based on the feedback signal, whether a valley for switching the converter in a quasi-resonant mode is available within a predetermined time range;

means for changing the mode for operating the converter if the valley is not available within the predetermined time range.

In addition, a computer program product is provided, which is directly loadable into a memory of a digital processing device, comprising software code portions for performing the steps of:

receiving a feedback signal, determining, based on the feedback signal, whether a valley for switching the converter in a quasi-resonant mode is available within a predetermined time range;

changing the mode for operating the converter if the valley is not available within the predetermined time range.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A method for operating a converter, the method comprising:
    determining whether a valley for switching the converter in a quasi-resonant mode is available within a predetermined time range;
    changing a mode for operating the converter when the valley is not available within the predetermined time range, the mode not being changed based on whether the valley is available when the valley is available within the predetermined time range; and
    changing the mode for operating the converter from the quasi-resonant mode to a discontinuous conduction mode by keeping an on-time of a transistor of the converter or a peak current constant and by increasing a switching period.

2. The method according to claim 1, further comprising selecting the valley if it is available within the predetermined time range.

3. The method according to claim 2, wherein the valley selected is used for valley switching of the converter in the quasi-resonant mode.

4. The method according to claim 2, wherein selecting the valley is limited by an upper threshold.

5. The method according to claim 2, wherein selecting the valley is limited by a lower threshold.

6. The method according to claim 2, wherein selecting the valley comprises directly selecting the valley based on an information about an occurrence of the valley.

7. The method according to claim 6, wherein the information of the occurrence of the valley is determined based on a time stored in a memory or based on a plurality of memory entries referring to occurrences of a plurality of valleys.

8. The method according to claim 2, wherein selecting the valley comprises incrementally selecting a subsequent valley or decrementally selecting an earlier valley.

9. The method according to claim 2, further comprising selecting the valley based on a valley previously selected.

10. The method according to claim 1, wherein the predetermined time range is at least partially related to a zero crossing oscillation after a switching element of the converter has been switched off.

11. The method according to claim 1, wherein the predetermined time range is determined by a low threshold and by a high threshold.

12. The method according to claim 11 wherein determining whether the valley for switching the converter in the quasi-resonant mode is available within the predetermined time range comprises determining whether the valley lies within the predetermined time range.

13. The method according to claim 11, wherein the valley occurs before the low threshold, the method further comprising selecting a subsequent valley that lies within the predetermined time range.

14. The method according to claim 11, wherein the valley occurs after the high threshold, the method further comprising selecting an earlier valley that lies within the predetermined time range.

15. The method according to claim 1, wherein changing the mode for operating the converter when the valley is not available within the predetermined time range comprises changing to a time-based operation.

16. The method according to claim 15, wherein the mode is entered when no valley is available and the converter needs to provide a high amount of energy towards a load.

17. The method according to claim 15, wherein the discontinuous conduction mode is entered if no valley is available and the converter needs to provide a low amount of energy towards a load.

18. The method according to claim 1, further comprising a control loop changing one or more switching parameters depending on an output power and an input voltage.

19. The method according to claim 18, further changing the mode for operating the converter from the quasi-resonant mode to a time-based mode by keeping a continuous operation with respect to the switching parameters.

20. The method according to claim 19, further comprising changing the mode for operating the converter from the time-based mode to the quasi-resonant mode by keeping the continuous operation with respect to the switching parameters.

21. The method according to claim 19, further comprising a hysteresis in a transition between the quasi-resonant mode and the time-based mode.

22. A method of operating a converter having a transformer, a transistor controlling a current through a primary side of the transformer, and a control unit for controlling switching of the transistor to generate current pulses in the transformer, the method comprising:
receiving a feedback signal;
determining, based on the feedback signal, whether a valley for switching the converter in a quasi-resonant mode is available within a predetermined time range;
changing a mode for operating the converter if the valley is not available within the predetermined time range; and
changing the mode for operating the converter from the quasi-resonant mode to a discontinuous conduction mode by keeping an on-time of the transistor or a peak current constant and by increasing a switching period.

23. The method according to claim 22, further comprising selecting the valley if it is available within the predetermined time range.

24. The method according to claim 22, wherein the feedback signal is indicative of a current through the primary side of the transformer.

25. The method according to claim 22, wherein the feedback signal relates to a power drawn by a load from a secondary side of the transformer.

26. The method according to claim 22, wherein the converter is part of a power supply.

27. A converter device comprising:
a transformer;
a transistor configured to control a current through a primary side of the transformer;
a control unit with an output coupled to a control node of the transistor to generate current pulses in the transformer, wherein the control unit is configured
to receive a feedback signal,
to determine, based on the feedback signal, whether a valley for switching the converter device in a quasi-resonant mode is available within a predetermined time range,
to change a mode for operating the converter device when the valley is not available within the predetermined time range, the mode not being changed based on whether the valley is available when the valley is available within the predetermined time range, and
to change the mode for operating the converter device from the quasi-resonant mode to a discontinuous conduction mode by keeping an on-time of the transistor or a peak current constant and by increasing a switching period.

28. The device according to claim 27, wherein the control unit is configured to select the valley if it is available within the predetermined time range.

29. The device according to claim 27, wherein the device is a switching mode power supply.

30. The device according to claim 27, wherein the control unit is arranged on a single chip or die.

31. The device according to claim 27, wherein the control unit is a single integrated device.

32. The device according to claim 27, wherein the control unit is coupled to a DC-isolated unit for receiving the feedback signal, the feedback signal being based on a current drawn from a secondary side of the transformer.

33. The device according to claim 27, wherein the control unit is coupled to an auxiliary winding of the primary side of the transformer, which provides the feedback signal that is based on a current drawn from a secondary side of the transformer.

34. A converter comprising:
a transformer;
a transistor controlling a current through a primary side of the transformer;
a control unit for controlling switching of the transistor to generate current pulses in the transformer, wherein the control unit comprises:
means for receiving a feedback signal;
means for determining, based on the feedback signal, whether a valley for switching the converter in a quasi-resonant mode is available within a predetermined time range;
means for changing a mode for operating the converter if the valley is not available within the predetermined time range; and
means for changing the mode for operating the converter from the quasi-resonant mode to a discontinuous conduction mode by keeping an on-time of the transistor or a peak current constant and by increasing a switching period.

35. A non-transitory computer program product directly loadable into a memory of a digital processing device, comprising software code portions for performing the steps of:
receiving a feedback signal;
determining, based on the feedback signal, whether a valley for switching a converter in a quasi-resonant mode is available within a predetermined time range;
changing a mode for operating the converter if the valley is not available within the predetermined time range; and
changing the mode for operating the converter from the quasi-resonant mode to a discontinuous conduction mode by keeping an on-time of transistor of the converter or a peak current constant and by increasing a switching period.

* * * * *